Sept. 12, 1933.    W. E. URSCHEL    1,926,705
VEGETABLE PEELER
Filed Aug. 29, 1929    2 Sheets-Sheet 2
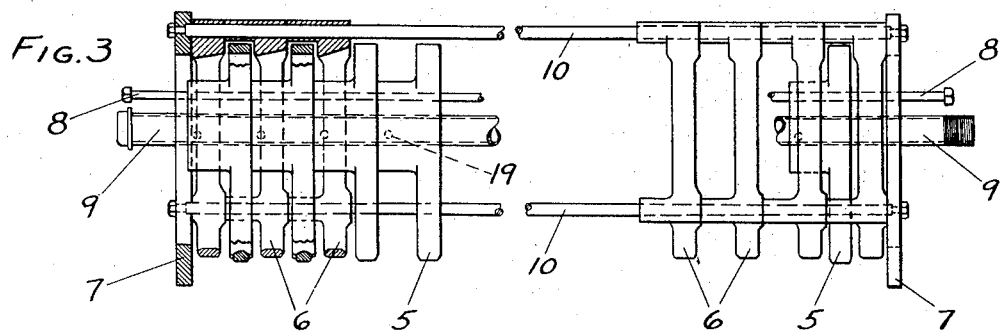
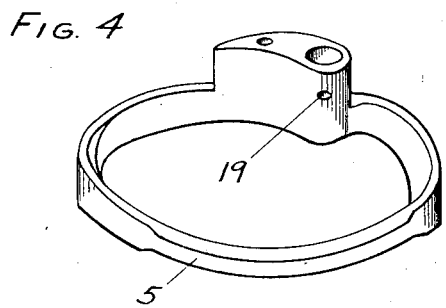
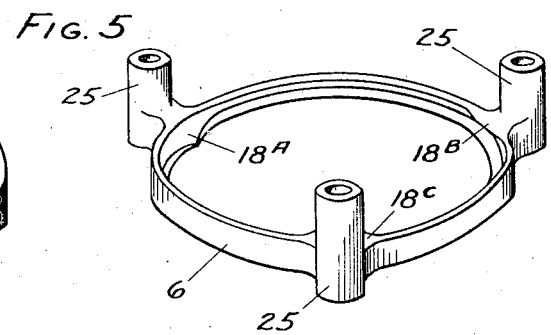
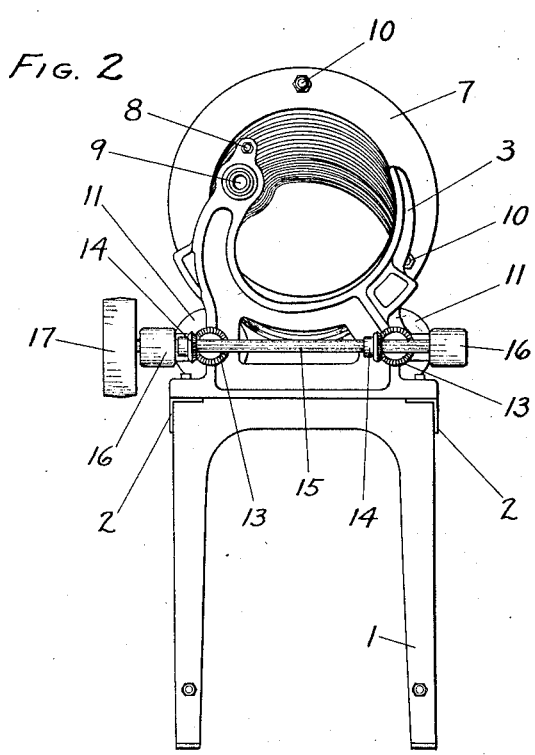
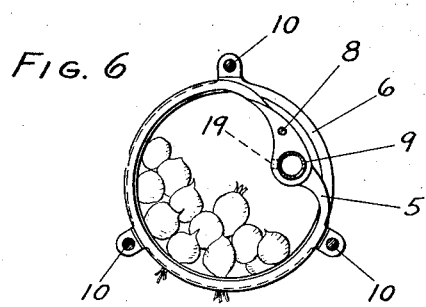
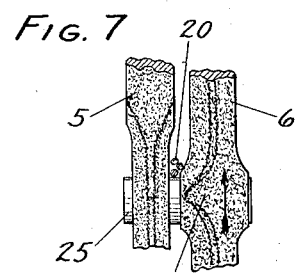
INVENTOR.
William E. Urschel
BY
ATTORNEY Patented Sept. 12, 1933

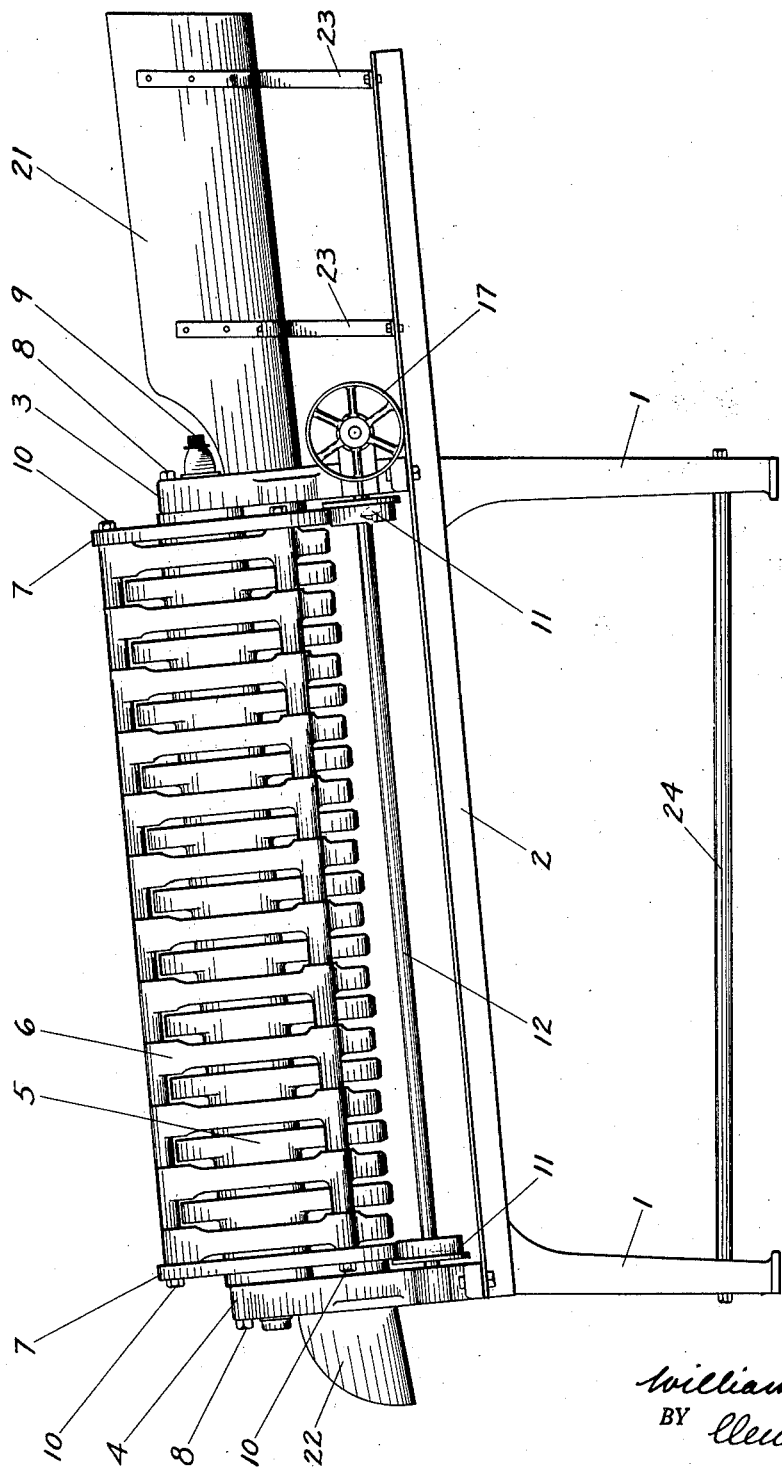

1,926,705

UNITED STATES PATENT OFFICE 1,926,705

VEGETABLE PEELER

William E. Urschel, Valparaiso, Ind.

Application August 29, 1929. Serial No. 389,135

16 Claims. (Cl. 146—49)

The present invention relates to a rotary type of vegetable peeler.

The primary object of the invention is to produce an improved peeler which will mechanically cleanse the vegetables simultaneously with the removal of the peeling thereof preparatory to canning, and in which there will be adequate means for the continuous discharge of the peeled vegetable.

The construction of the peeler is simple and readily understood. It comprises (in its illustrated embodiment) two interlaced cylinders each composed of a plurality of members, one cylinder being stationary, and the other rotatable.

The parts of each cylinder consist of rings, the inside portions of which are covered with an abrasive which is of coarse character at the feed end and which becomes finer toward the discharge end. This variation of the abrasive acts in such a manner that the vegetables are peeled by the coarser abrasive and, as they near the discharge end, are made smooth by the finer abrasive, this being desirable when raw vegetables are to be peeled.

In case the vegetables are partially cooked before peeling, little or no abrasive is necessary.

The idea of an abrasive for peeling purposes has been employed in the construction of potato peelers but so far as is known, its application to rings of a machine of the construction of the present device has not been made.

The rotary movement of one cylinder tumbles the vegetables through the interlaced cylinders, thus peeling them by their contact with the abrasive surfaces, and finally discharges the peeled vegetables through a hopper.

The arrangement of the two members of the interlaced cylinders is such that the edges of the members of one cylinder form with the opposing edges of the members of the other interlaced cylinder a unit having circumferential openings of varying width.

What is more, these openings are arranged such that the tops and roots projecting therethrough are severed, or more correctly, pinched off during the process of peeling. The peeling, severed tops and roots are washed away by water streaming through the interlaced cylinders.

No spokes are employed in the construction of the cylinders of this machine thus eliminating any congestion of vegetables therein from obstruction by such spokes.

The invention will be more fully understood by the following detailed description when considered with the accompanying drawings, wherein Figure 1 is a side elevation of a vegetable peeler constructed in accordance with the present invention;

Figure 2 is an end elevation of the same machine (hopper removed) looking from the right hand side of Figure 1;

Figure 3 is a view and part section showing the construction and relation of the cylinders to each other;

Figure 4 is a perspective view of a stationary ring;

Figure 5 is a perspective view of a rotatable ring;

Figure 6 is a section showing the relative positions of the rings of each cylinder; and Figure 7 is a section illustrating the manner in which the tops and roots are removed.

In the description which follows, like reference characters are used throughout to designate similar members in the several views.

Reference should be had first to Figures 1 and 2. The frame for the device comprises two two-legged transverse standards 1 secured together by two longitudinally extending frame members 2 one end of which projects beyond the one end member, and by braces 24. Feed hopper 21, supported by members 23, is mounted on the projecting end of frame members 2.

Also mounted upon frame members 2, are end members 3 and 4 which hold in place a stationary cylinder comprising a plurality of rings 5 (Figure 3) which are securely held together and to the end frames 3 and 4 by a tie rod 8 and a water pipe 9, the whole forming a rigid structure.

There is also a rotatable cylinder comprising two end rings 7 and a number of parallel intermediate rings 6 (Figure 3) securely fastened together by three tie rods 10 which clamp the members 6 and 7 into a rigid structure. The movable cylinder is supported upon and is driven in a rotary manner by end rings 7 which are mounted on travellers or rollers 11 (Figure 1) and which rollers are secured to a shaft 12 journalled in the end frame bearings.

Also secured to shaft 12 are bevel gears 13 driven by bevel gears 14 secured to a shaft 15 (Figure 2) which shaft 15 is journaled in bearings 16. A pulley 17 secured to said shaft 15 is driven by a belt (not shown) from a suitable source of power (also not shown).

As previously stated, Figure 4 is a perspective view showing the construction of a stationary ring 5 and the perforation 19 through which water flows into the cylinders, while Figure 5 is a perspective view illustrating the construction of a rotatable ring 6 having bosses 25 with holes through which tie rods 10 are inserted to secure the several rings together. In these rings there are raised portions 18A and 18B and 18C (the latter not clearly visible) which serve to agitate the vegetables as described in the following explanation of Figure 6. The transverse faces of rings 6 are parallel except that at every 120° there is an enlarged portion while the transverse faces of rings 5 contain depressed sections.

In Figure 6, there is an illustration through the cylinders showing the relation of a ring 5 of the stationary cylinder to a ring 6 of the rotatable cylinder, also showing the position of vegetables being tumbled through the interlaced cylinders. The raised portions or bumps 18A, 18B and 18C on the insides of rings 6 strike vegetables inclined to rest on the stationary rings 5 and produces a skidding of the vegetables against the abrasive insides of the rings. As the vegetables possess a tendency to rest upon each consecutive stationary ring, they are struck by these raised portions 18A, 18B and 18C of an adjacent rotatable ring and are continuously skidded and bumped about until finally discharged from the cylinder.

Figure 7 is a fragmentary section of a stationary ring 5 and a rotatable ring 6 illustrating the manner in which tops and roots 20 are severed from the vegetables. As ring 6 moves in the direction of the arrow, the top and roots are adapted to protrude through the opening between the rings 5 and 6. This opening is wider at certain points, and said top and root project thereinto to be pinched off as the vegetable is rolled toward the end of the depressed portion of the ring 5 where the opening between the rings 5 and 6 becomes sufficiently narrow to do so in the course of the revolution of the rotatable cylinder. The enlarged sections on rings 6 assist in driving the vegetables in a manner which will cause them to have their projecting roots and tops so squeezed off.

The machine, mounted in a slanting position, causes the vegetables, by gravity, to work gradually therethrough as they are tumbled about and peeled in the cylinders, from the feeding end to the discharging end where hopper 22 secured to end frame 4 guides the peeled vegetables into any suitable container beneath the mouth thereof. Water from outlet 19 plays over the vegetables removing particles of peeling, roots and tops as detached, these readily passing between rings 5 and 6.

It will now be clear that broadly considered, this vegetable peeler consists of a rotatable cylinder, with its rings alternate and in a parallel arrangement with those of a stationary cylinder, the rotating of which rotatable cylinder produces a tumbling effect on the confined vegetables therein, thus peeling them due to frictional engagement with the abrasive faced rings in the cylinders.

Simultaneously with the peeling, the openings between the rings 5 and 6 of the two cylinders through which the tops and roots of the vegetables project are reduced at certain points in the revolution of the rotatable cylinder, due to the construction of the stationary rings, the projecting parts of the vegetables being pinched off, thus removing the protruding tops and roots. All of the refuse falls by gravity through the cylinder openings or is washed therethrough by the water flushing the vegetables.

The parts 18A, 18B and 18C, which travel at a high rate of speed because of the rapid rotation of ribs 6, in addition to agitating the vegetables within the tunnel formed of the two cylinders, one stationary and the other rotatable, thus facilitating the travel of the vegetables from the loading end of the device to the discharge hopper, also provide for the removal of the skin or epidermis of the vegetables by removing a small section of skin each time these parts contact with the vegetable. They may be said to chip the skin from the vegetable.

The speed of travel of the vegetable from one end to the other of the peeler is such that each article is deprived of its entire epidermis during its journey through the apparatus.

Additionally, the flow of water from spouts 19 is such that the vegetable is thoroughly cleansed as well as peeled, the chips of peeling, pieces of tops, and fragments of roots being washed from the tunnel at the bottom thereof and between the ribs 5 and ribs 6 as a result of the constant internal flushing of the apparatus and of its contents.

I claim:

1. A vegetable peeler comprising an inclosed frame, stationary annular members upon said frame, each of said annular members having an arcuate section of its radial face removed, a movable cylinder of annular members disposed between said stationary annular members; and means for rotating said cylinder.

2. A vegetable peeler comprising an inclosed frame, stationary annular members upon said frame, a movable cylinder of annular members disposed between said stationary annular members, each of said annular members having an extension upon its radial face, and means for rotating said cylinder.

3. A vegetable peeler comprising an inclosed frame, stationary annular members upon said frame; a movable cylinder of annular members disposed between said stationary annular members, each of said annular members having an extension upon its lateral face and a lug upon its internal face, and means for rotating said cylinder.

4. A vegetable peeler comprising an inclosed frame, stationary annular members upon said frame, each of said annular members having an arcuate section of its lateral face removed; a movable cylinder of annular members disposed between said stationary annular members; each of said annular members having an extension upon its lateral face, and means for rotating said cylinder.

5. A vegetable peeler comprising an inclosed frame, stationary annular members upon said frame, each of said annular members having an arcuate section of its lateral face removed, a movable cylinder of annular members disposed between said stationary annular members, each of said annular members having an extension upon its lateral face and a lug upon its internal face, and means for rotating said cylinder.

6. A vegetable peeler comprising an inclosed frame, stationary annular members upon said frame, each of said annular members having an arcuate section of its lateral face removed, a movable cylinder of annular members disposed between said stationary annular members, each of said annular members having an extension upon its lateral face and a lug upon its internal face, all of said members having abrasive faces, the degree of abrasiveness progressively decreasing towards one end of the peeler, and means for rotating said cylinder.

7. A vegetable peeler comprising an inclosed frame, stationary annular members upon said frame, each of said annular members having an arcuate section of its lateral face removed, a movable cylinder of annular members disposed between said stationary annular members, each of said annular members having an extension upon its lateral face and a lug upon its internal face, all of said members having abrasive faces, the degree of abrasiveness progressively decreasing towards one end of the peeler, means for continuously flushing said peeler, and means for rotating said cylinder.

8. A vegetable peeler comprising an unobstructed cylinder of a series of spaced-apart rings, a common support for said rings and disposed at one side thereof, a second unobstructed cylinder comprising rings disposed interjacently with the first named rings, means exterior of said cylinders for commonly supporting the secondly named rings, and means for rotating said second cylinder about its principal axis.

9. A vegetable peeler comprising two ribbed cylinders, the ribs of one cylinder being interspaced with those of the other, an internal support for the ribs of one cylinder and arranged at one side thereof, an external support for the ribs of the other cylinder, and means for effecting the relative rotative movement of said cylinders.

10. A vegetable peeler comprising an unobstructed cylinder, there being spaced apart rings for forming the walls of said cylinder, an internal support for said rings at a side of said cylinder, a second cylinder comprising rings interspaced with the first mentioned rings, an external support for the secondly mentioned rings, and means for effecting relative rotative movement of said cylinders about an axis common to both.

11. A vegetable peeler comprising an unobstructed cylinder including two sets of interspaced rings, one set of said rings having raised portions extending inwardly of said cylinder, an internal support for one set of said rings at a side thereof, and an external support for the other set of rings having the raised portions.

12. A vegetable peeler comprising an unobstructed cylinder including two series of interspaced rings having protruding sections upon the opposed faces thereof, a common internal support for one series of said rings at one side thereof, an external member for the common support of the other series of said rings, and means for effecting relative rotation of said series of rings about the principal axis of said cylinder.

13. A vegetable peeler comprising an unobstructed cylinder including two series of interspaced rings having protruding and depressed portions upon their opposed faces and inwardly projecting raised portions from one of said series of rings, a common internal support for one of said series of rings at a side thereof, a common external support for the other series of said rings, and means for effecting relative rotation between said series of rings about the principal axis of said cylinder.

14. A vegetable peeler comprising an unobstructed cylinder including two series of interspaced rings having protruding and depressed portions upon their opposed faces and inwardly projecting raised portions from one of said series of rings, a common internal support for one of said series of rings at a side thereof, a common external support for the other series of said rings, and means for rotating the series of said rings bearing the inwardly projecting raised portions about the principal axis of said cylinder.

15. A vegetable peeler comprising two interwoven cylinders, interspaced rings forming the walls of said cylinders, an exterior support for one set of said rings, and an internal connection for the other set of said rings at one side thereof and so placed as not to interfere with a free tumbling or cascading of fruit and vegetables.

16. A vegetable peeler comprising a series of spaced apart similar annular members, a second series of spaced apart annular members, the members of one series being interspaced with the members of the other series and alternately arranged in respect thereto, the members of both series being substantially of the same diameter, means at one side of one series of members for maintaining said series of members stationary, and means upon the outer periphery of said other series of members for rotating said series of members relatively to said stationary members.

WILLIAM E. URSCHEL.